United States Patent
Fry et al.

(10) Patent No.: US 8,650,437 B2
(45) Date of Patent: Feb. 11, 2014

(54) COMPUTER SYSTEM AND METHOD OF PROTECTION FOR THE SYSTEM'S MARKING STORE

(75) Inventors: Richard E. Fry, Round Rock, TX (US); Marc A. Gollub, Round Rock, TX (US); Luis A. Lastras-Montano, Cortlandt Manor, NY (US); Eric E. Retter, Austin, TX (US); Kenneth L. Wright, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 712 days.

(21) Appl. No.: 12/825,521

(22) Filed: Jun. 29, 2010

(65) Prior Publication Data

US 2011/0320911 A1    Dec. 29, 2011

(51) Int. Cl.
*G06F 11/00* (2006.01)

(52) U.S. Cl.
USPC ............ 714/6.24; 714/42; 714/752; 714/758; 714/768

(58) Field of Classification Search
USPC .............. 714/6.1, 6.24, 42, 52, 752, 758, 768
See application file for complete search history.

(56) References Cited

U.S. PATENT DOCUMENTS

| | | | |
|---|---|---|---|
| 4,742,448 A * | 5/1988 | Sander et al. | 711/111 |
| 5,379,036 A * | 1/1995 | Storer | 341/51 |
| 7,392,350 B2 | 6/2008 | Fields, Jr. et al. | |
| 7,823,043 B2 * | 10/2010 | Lasser | 714/755 |
| 8,046,628 B2 * | 10/2011 | Resnick | 714/6.2 |
| 8,352,806 B2 * | 1/2013 | Gollub et al. | 714/54 |
| 8,386,868 B2 * | 2/2013 | Lasser | 714/746 |
| 2003/0108194 A1 * | 6/2003 | Calvignac et al. | 380/36 |
| 2005/0289402 A1 * | 12/2005 | Nerl et al. | 714/52 |
| 2007/0005795 A1 * | 1/2007 | Gonzalez | 709/232 |
| 2008/0307287 A1 | 12/2008 | Crowell et al. | |
| 2009/0106588 A1 * | 4/2009 | Meaney et al. | 714/16 |
| 2009/0222910 A1 * | 9/2009 | Le Bihan et al. | 726/19 |
| 2009/0319859 A1 * | 12/2009 | Alrod et al. | 714/752 |
| 2010/0287436 A1 * | 11/2010 | Lastras-Montano et al. | 714/752 |
| 2010/0287445 A1 * | 11/2010 | Dell et al. | 714/763 |
| 2010/0287454 A1 * | 11/2010 | Dell et al. | 714/807 |
| 2010/0293436 A1 * | 11/2010 | Coteus et al. | 714/763 |

(Continued)

OTHER PUBLICATIONS

The A Register http://www.theregister.co.uk/2010/02/08/ibm_power7_chip_launch/ Power7 v Power6—its all about the cache Feb. 8, 2010.

(Continued)

*Primary Examiner* — Loan L. T. Truong
(74) *Attorney, Agent, or Firm* — Lynn L. Augspurger; Robert R. Williams

(57) ABSTRACT

A method and apparatus for controlling marking store updates in a central electronic complex with a plurality of core processors and eDRAM cache and interconnect bus to a service processor for loading memory controller firmware to dual-channel DDR3 memory controllers with an internal marking store. Loaded firmware of the memory controllers is responsible for tracking of ECC errors using a ECC decoder control whereby said marking store is written by a slow ECC decoder, and read by a fast ECC decoder for every read operation of said memory controllers to provide a blocking mechanism for notifying marking store firmware when the marking store has been updated and which guarantees that marking store firmware cannot write to the marking store until the marking store firmware has seen updates without causing the marking store hardware to time out.

19 Claims, 5 Drawing Sheets

(56) References Cited

U.S. PATENT DOCUMENTS

2010/0293437 A1* 11/2010 Gollub et al. ............... 714/763
2010/0293438 A1* 11/2010 Lastras-Montano et al. . 714/763
2010/0299576 A1* 11/2010 Baysah et al. ............... 714/763
2011/0161630 A1* 6/2011 Raasch et al. ............... 712/205

OTHER PUBLICATIONS

POWER7 systems Upgrade considerations for POWER7 systems http://publib.boulder.ibm.com/infocenter/powersys/v3r1m5/index.jsp?topic=/p7hbm/p7considerations.htm Feb. 8, 2010.

* cited by examiner

| SCOM SET | SCOM READ AND READ_IP=1 | H/W MARK WRITE | READ IN PROGRESS NEXT STATE |
|---|---|---|---|
| 0 | 0 | 0 | 0 |
| 0 | 0 | 1 | 0 |
| 0 | 1 | 0 | 0 |
| 0 | 1 | 1 | 0 |
| 1 | 0 | 0 | 1 |
| 1 | 0 | 1 | 0 |
| 1 | 1 | x | n/a |

FIG.1

| SCOM READ AND READ_IP=1 | H/W MARK WRITE | H/W MARK ATTENTION NEXT STATE |
|---|---|---|
| 0 | 0 | 0 |
| 0 | 1 | 1 |
| 1 | 0 | 0 |
| 1 | 1 | 1 |

FIG.2

COMPUTER SYSTEM AND METHOD OF PROTECTION FOR THE SYSTEM'S MARKING STORE

TRADEMARKS

IBM® and Power® are registered trademarks of International Business Machines Corporation, Armonk, N.Y., U.S.A. Other names used herein may be registered trademarks, trademarks or product names of International Business Machines Corporation or other companies.

FIELD OF THE INVENTION

This invention relates to a computer processing system, and particularly to a computer system having a marking store, and a method of protecting the marking store during operations.

DESCRIPTION OF BACKGROUND

In the computer systems known as the IBM® Power®7 Systems or POWER®7 computer system design. The POWER®7 computer system is an announced prospective successor for the Power®6 computer system. United States patent application US2008/307287A1 entitled: SYSTEM AND METHODS FOR RECOVERY FROM HARDWARE ACCESS ERRORS, filed Jun. 7, 2007 under application Ser. No. 11/759,331, by Daniel M. Crowell et al, and assigned to International Business Machines Corporation, the assignee of this application, is incorporated herein fully by reference, and describes material used in the Power®6 computer system. The Power®7 computer system is expected to be compatible with the Power®6 computer system and has a marking store that can be read and written by firmware through IBM's SCOM (Scan Communication). This Scan Communication is an inter-chip communication protocol like that described in U.S. Pat. No. 7,392,350, issued Jun. 24, 2008, entitled: METHOD TO OPERATE CACHE-INHIBITED MEMORY MAPPED COMMANDS TO ACCESS REGISTERS, by James S. Fields, Jr. et al, also assigned to International Business Machines Corporation, the assignee of this application. U.S. Pat. No. 7,392,350 is incorporated herein fully by reference. As system design improves, integrating the hardware and firmware used becomes difficult, and this application addresses improvements we have made to the Power®7 computer system having a marking store to protect the marking store during high speed operations of the system.

SUMMARY OF THE INVENTION

In accordance with our invention we have provided each memory controller for the computer system illustrated in FIG. 6 with a marking store which is written by a slow decoder, and read by the fast decoder (for every read op) and protected with a locking mechanism or method which allows the hardware continuous access to the marking store and allows for the controller firmware to be notified if the marking store has been updated and guarantees that firmware cannot write to the marking store until the firmware has seen any updates.

As the slow decoder can generally find a mark again if it assumes there is no mark placed, we set the value read from a mark store to a 0 when there is a parity error detected. If the slow decoder is able to recalculate the mark it can be placed back in the mark store with good parity.

Additional features and advantages are realized through the techniques of the present invention. Other embodiments and aspects of the invention are described in detail herein and are considered a part of the claimed invention. For a better understanding of the invention with advantages and features, refer to the description and to the drawings.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

FIG. 1 illustrates the marking store address register setting of status bits.

FIG. 2 illustrates the hardware (HW) Mark Attention register.

The detailed description explains the preferred embodiments of the invention, together with advantages and features, by way of example with reference to the drawings.

DETAILED DESCRIPTION OF THE INVENTION

Figure 6:
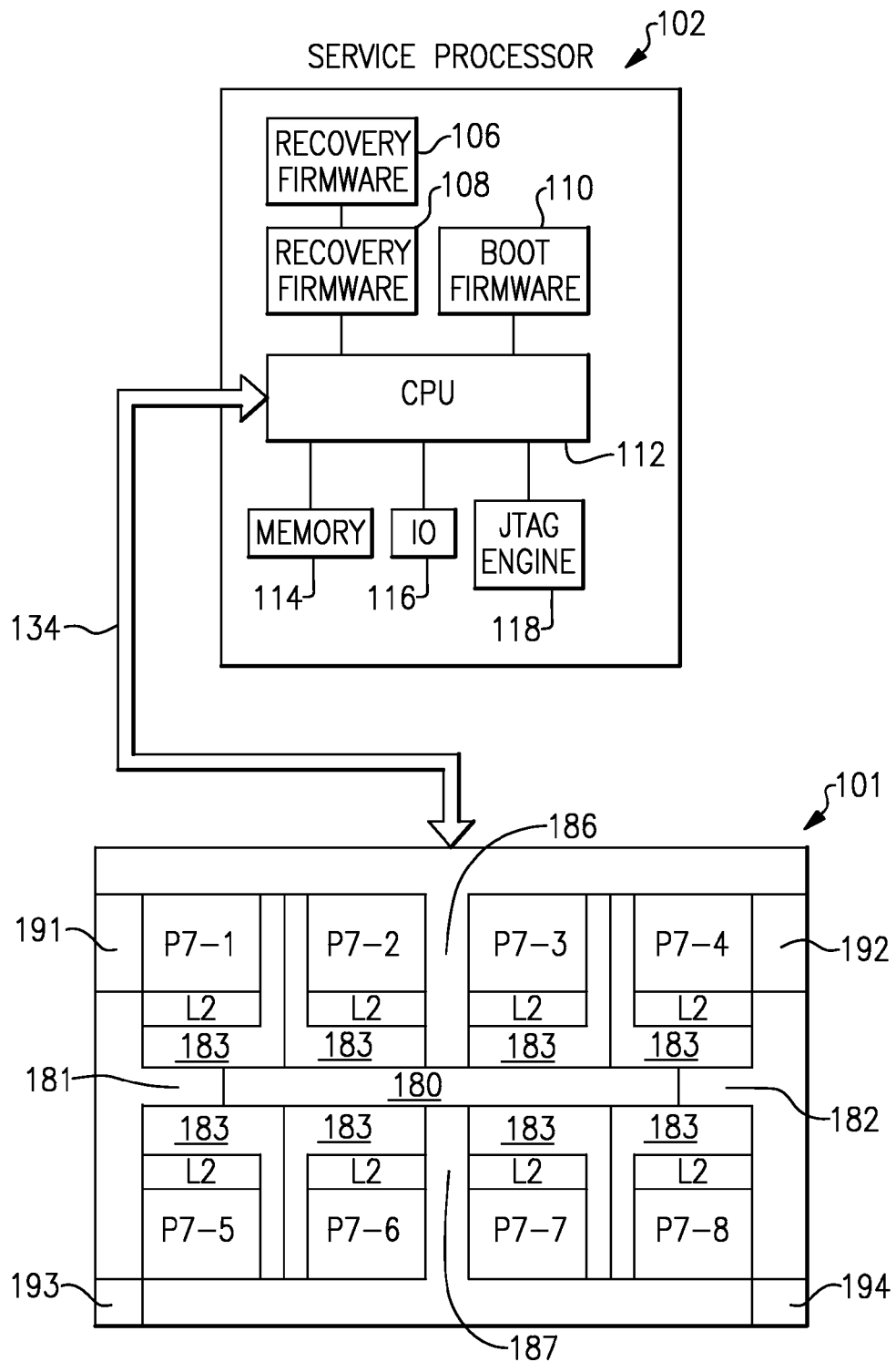
FIG. 6 illustrates the computer system with service processor and CEC implementing the preferred embodiment.
Figure 7:
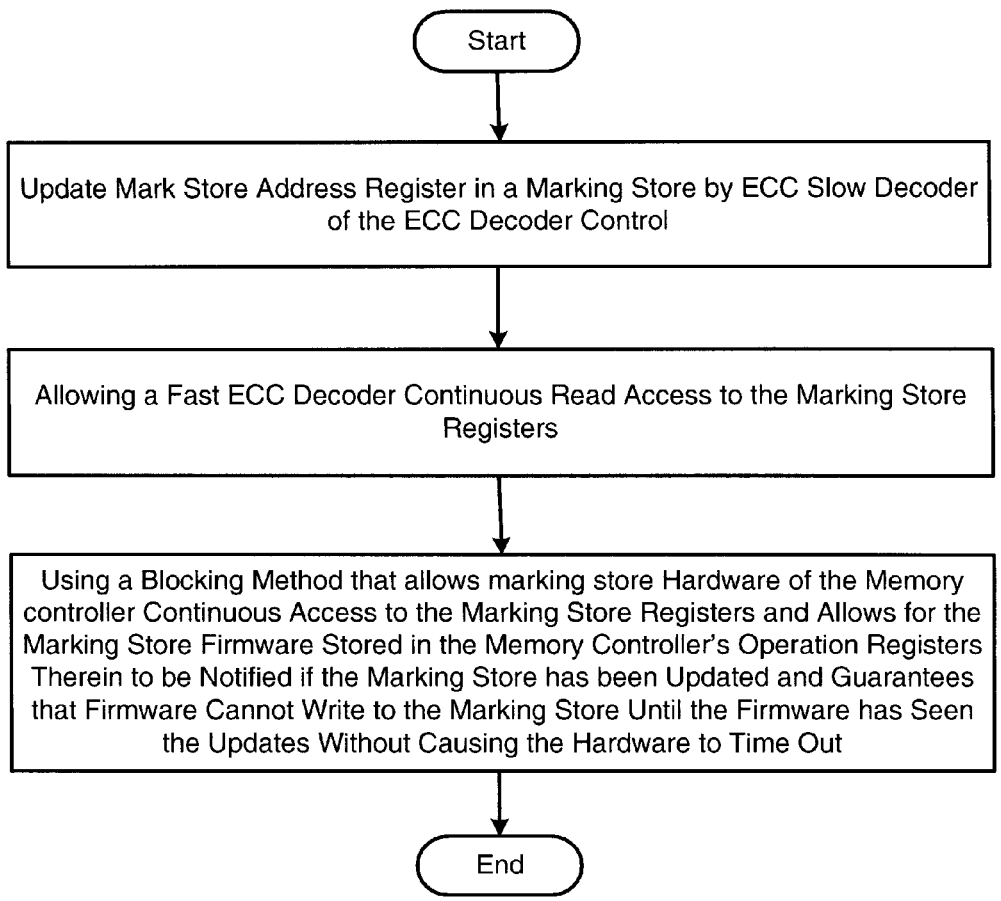
FIG. 7 is a flow chart of a method embodiment of the invention.

Like the P6 computer system described in US patent application US2008/307287A1, typically the POWER®7 computer system is booted from a service processor which over bus 134 loads the firmware for the POWER®7 CEC system memory controllers 181, 182, as illustrated by FIG. 6 over the multi-drop L3 cache and chip interconnect bus 180 which interconnects the L3 caches for each of eight processor cores P7-1 to P 7-8. ("P7-n" as used herein and in FIG. 6 refer to cores used in a "Power®7 computer system".) The Central Electronic Complex (CEC) 101 of the Power®7 computer system provides the eight processor cores P7-1 to P7-8 that provides more cores per CEC and speed advances over the Power®6 and Power®6+ computer system cores illustrated in US2008/207287A1. Each of the Power®7 computer system cores has 12 execution units: two fixed point units, two load store units, four double-precision floating point units, one vector unit, and one decimal floating point unit. Through the Symmetric Multi-Processor (SMP) Local SMP Links 186 and Remote SMP Links 187 these processors are connected to other system elements.

The cores support out-of-order execution and are binary compatible with the prior Power® chips and at the present time use the same AIX operating system. Each Power®7 computer system core has 32 KB of L1 instruction cache and 32 KB of L1 data cache and 256 KB of L2 cache tightly coupled to it. The CEC chip has 32 MB of L3 cache implemented in embedded DRAM (eDRAM, not static RAM, or SRAM), and this is carved up into eight POWER®7 computer system segments with 4 MB chunks affiliated with each one of the eight cores in the fast local L3 region, illustrated by region 183 for the illustrated core P7-2, and having similar fast local L3 eDRAM 183 regions for the other cores of the CEC.

The eDRAM is slower than SRAM, but in the eDRAM L3 183 which fits on the chip, it is a lot closer to the cores than former L3 off-chip SRAMs. As noted, the Power®7 processor chip has two dual-channel DDR3 memory controllers with internal mark store registers 181, 182 implemented on the chip that delivers 100 GB/sec of sustained bandwidth per chip. Each of the CEC's (central electronic complex or processor) system memory controllers 181, 182 contains a 4-byte/rank mark store 193, 194, which is used to store marking data associated with each memory rank. The marking store can be read and written by firmware through IBM's SCOM (Scan Communication), written by the slow decoder, and read by the fast decoder (for every read op) of the decoder controls 191, 192 of the memory controllers 181, 182. Since POWER®7 CEC has 128 memory ranks supported, 128×4 bytes of marking store is required. In the POWER®7 CEC, this storage is implemented as two 2r1w64×33 register files. The content of the register files is protected by a single parity bit covering the 4-bytes of marking information per entry (rank). Sense parity is used to protect the marking store. However, we have learned that a corrupted mark could result in a UE (uncorrectable error) from our ECC (error correcting Code) decoder controls 191, 192 having the fast and slow decoders. If, as was a normal design, a parity checker would be set to cause a system checkstop if the checker is set or a detection scheme goes off. That scheme, however, provides in the array a single point of failure.

In the Power®7 CEC implementation of marking for ECC, the CEC hardware is responsible for detecting and apply chip kill marks to the marking store because the chip kill mark needs to be done quickly to ensure low miscorrect rates. The memory controller marking store firmware is responsible for tracking and identifying symbol marks because it requires tracking of ECC errors across a large number of accesses and firmware is less time critical for applying the symbol marks because the symbol marks have no miscorrect rate. However, this means that both the hardware and firmware need access to the marking store.

There are changes with the POWER®7 CEC design that impact performance. The chip includes 32 MB of on-chip L3 cache memory implemented in embedded DRAM instead of the off-chip L3 cache that was used with all the prior dual-core POWER® chips. This 32 MB of on-chip L3 eDRAM cache has allowed it to create that L3 cache in such a way that using static RAM would have boosted the transistor count to around 2 billion transistors. The eDRAM cache can store one bit of data using only one transistor and one capacitor instead of the six transistors needed for storing one bit using static RAM.

The effect of this eDRAM on the POWER®7 CEC design, and its performance, is two-fold. First, by adding the L3 cache onto the chip, the latency between the cores and the L3 memory has been reduced by a factor of six. This means the Power7 cores are waiting a lot less for data than the previous Power cores were. This, however, has caused the time scales of nano second (ns) hardware and millisecond (ms) firmware to be so different that a firmware lock could cause the hardware to time out, and this problem needed to be solved to prevent unneeded system check stops.

This problem has been solved by the methods employed herein in connection with the new hardware which allows used of a blocking method which accommodates the time scales of nano second (ns) hardware and millisecond (ms) firmware which are so different and yet does not cause the hardware to time out.

The preferred embodiment of the CEC of FIG. 6 describes a blocking method that allows marking store hardware (HW) of the memory controller(s) 181, 182 continuous access to the marking store registers 193, 194 and allows for the marking store firmware (FW) stored in the memory controller's operation registers 181, 182 therein to be notified if the marking store 193, 194 has been updated and guarantees that firmware cannot write to the marking store until the firmware has seen the updates without causing the hardware to time out.

FIG. 1 illustrates the marking store address register of the marking store 193, 194 of the memory controllers' setting of status bits of the memory controller's 181, 182 (FIG. 6).
Mark store locking makes use of the following hardware status bits:
Read in Progress—read by SCOM, set/reset by SCOM, reset by hardware when the Mark Store is updated. The values in the marking store address register are used to indicate when a hardware update to the mark store has occurred before firmware has read the entire Mark Store.

FIG. 2 illustrates the hardware (HW) Mark Attention register of 181, 182, which is read by SCOM, reset by SCOM, and set by marking store hardware when the Mark Store address register illustrated by FIG. 1 is updated by a 64-byte ECC slow decoder of the ECC decoder control 191, 192 of the memory controllers of the POWER®7 CECs. This hardware Mark Attention register is used to prevent a firmware (FW) mark updates from overwriting a hardware mark update, and to notify firmware that a hardware mark has occurred.

Figure 3:
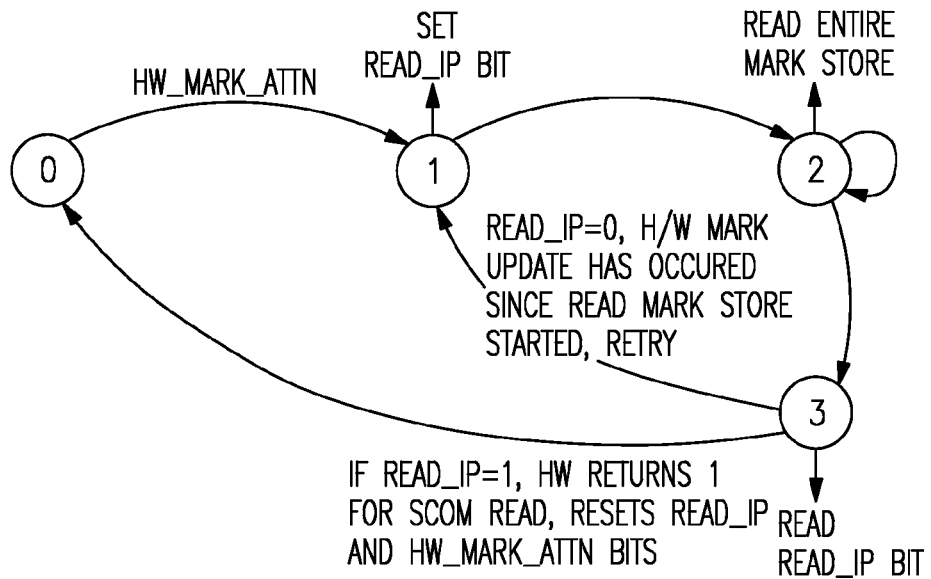
FIG. 3 illustrates the hardware flow diagram.

FIG. 3 illustrates the hardware flow diagram. When the hardware Mark Attention register bit is set, SCOM writes to the Mark and the Store is inhibited. The hardware Mark Attention bit is also used to notify firmware that hardware has updated the Mark Store.

Figure 4:
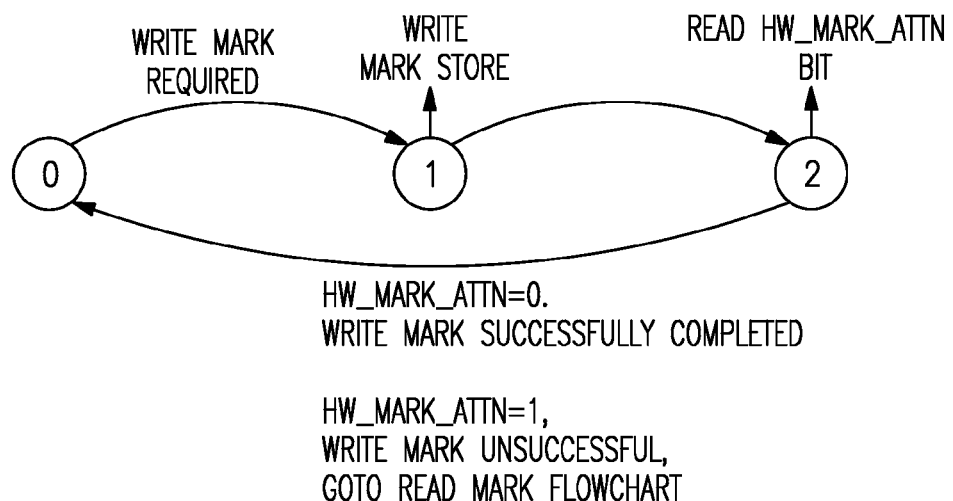
FIG. 4 shows the Firmware Write Mark Store Flow diagram.

FIG. 4 shows the Firmware Write Mark Store Flow diagram. The HW Mark Attention register bit is set=0 when the Mark Store is updated with a write, which notifies that a Write Mark was successfully completed, enabling a read. However, when the HW Mark Attention register bit is =1 then the Write Mark was unsuccessful and the state at 2 goes to the Read Mark Flowchart. Note that the HW Attention bit set could occur multiple times between states 1 and 2.

Figure 5:
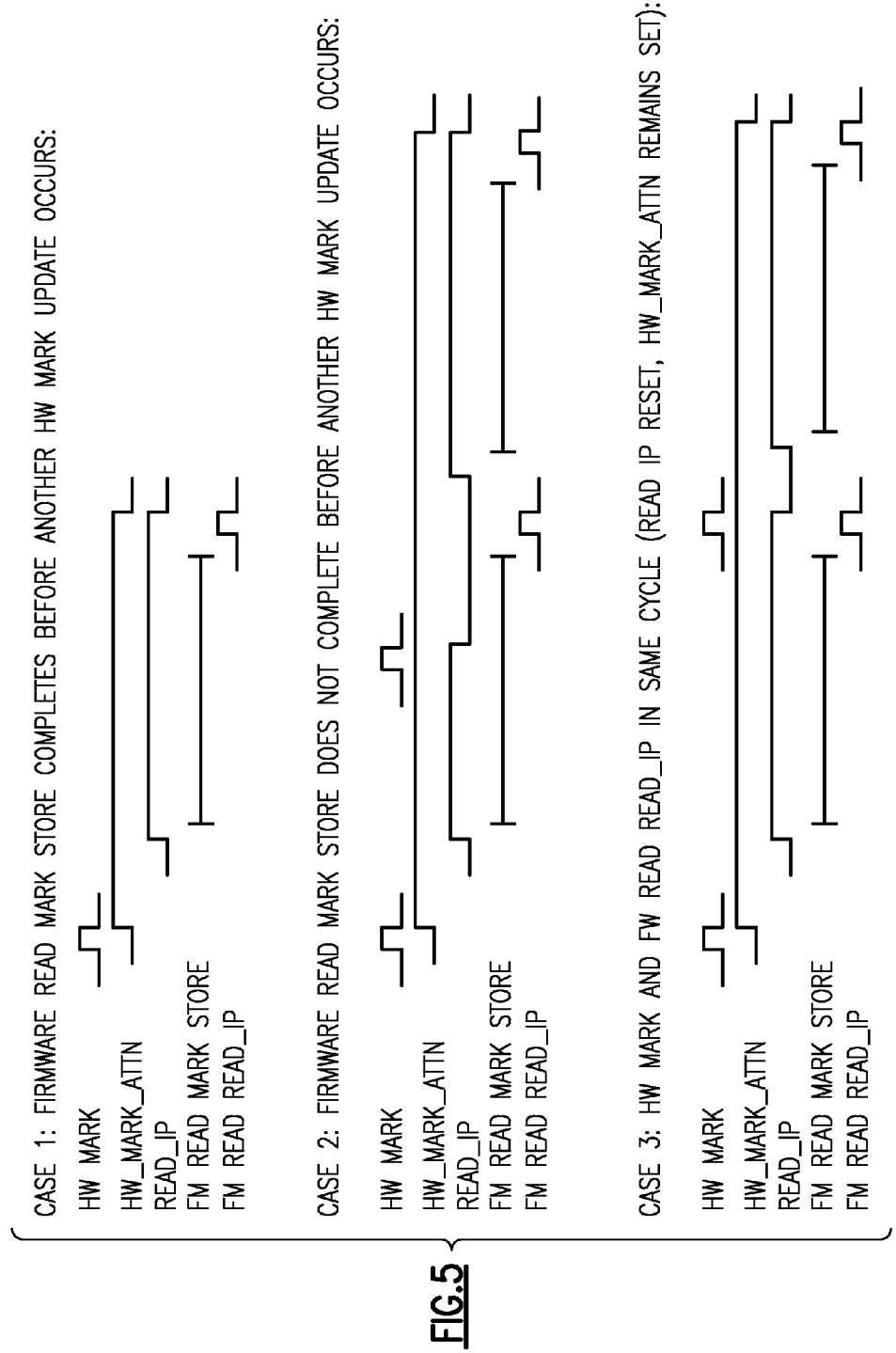
FIG. 5 illustrates sequence timing examples.

FIG. 5 illustrates sequence timing examples. Case 1 shows that the Firmware Read Mark Store completes before another hardware Mark update occurs. Case2 shows that the Firmware Read Mark Store does not complete before another HW Mark update occurs; and Case 3 shows the HW Mark and FW Read—Read_IP in same cycle (Read IP Reset, HW_Mark_attn remains set).

FIG. 6 illustrates the computer system with service processor 102 and a CEC 101 implementing the preferred embodiment. The service processor loads the memory controller firmware at boot into the CEC which has two memory controllers for 8 cores. Each of the memory controllers has the registers for the register files. L3 memory is provided adjacent the cores for fast access.

The content of the register files is protected by a single parity bit covering the 4-bytes of marking information per entry (rank). Parity is generated when data is written to the mark store (either by firmware or the ECC slow decoder), and is checked by the fast decoder. If a mark store parity error is detected by the fast decoder of ECC controls 191, 192, a Finite Impulse Response (FIR) bit it set, and the mark data read from the mark store is forced to zero by the fast decoder (for this read op only). This provides for possible recovery of a mark store parity error, through a re-write of mark data by firmware or hardware. This eliminates the need for setting a checkstop and is much better than setting a checkstop for a mark store parity error.

Within the memory controllers 181, 182 the marking store is written by the slow decoder of ECC controls 191, 192, and read by the fast decoder (for every read op) of the ECC controls. Since POWER®7 CEC has 128 memory ranks supported, 128×4 bytes of marking store is required. In the POWER®7 CEC, this storage is implemented as two 2r1w64×33 register files. The content of the memory controller's marking store register files is protected by a single parity bit covering the 4-bytes of marking information per entry (rank). Sense parity is used to protect the marking store. However, as we have said, a corrupted mark could result in a UE from the ECC decoder. Instead we have adopted our design to avoid any single point of failure.

In the POWER®7 CEC implementation of marking for ECC, the hardware is responsible for detecting and apply chip kill marks to the marking store because the chip kill mark needs to be done quickly to ensure low miss-correct rates. The controller firmware is responsible for tracking and identifying symbol marks because it requires tracking of ECC errors across a large number of accesses and firmware is less time critical for applying the symbol marks because the symbol marks have no miss-correct rate. However, this means that both the hardware and firmware need access to the marking store. The conventional solution would be to have a dual ported memory marking store with locking. But since the time scales of nano second (ns) hardware and millisecond (ms) firmware are so different a firmware lock could cause the hardware to time out.

Given that hardware will apply chip marks in the POWER®7 CEC we have provided a facility for a work around in case of hardware bugs. The work around is implemented in system software. The system software interacts with the marking process by allowing system firmware (FW) to alter or block marks before the hardware (HW) applied them.

In implementing the interface to the ECC decoders we made a change in the way the disable automatic mark store update function works. To address our concern of hardware bugs in the marking logic, we set up a process that proceeds as follows:

a) if a control interrupt or "chicken" switch is set, then, b) an unused mark store address register entry is updated with the updated mark data value generated by the slow ECC decoder (if the slow decoder found a valid mark), and the firmware (FW) is notified that the mark store has been updated with the updated mark value.

c) then, this updated mark value is used to correct the data currently being processed by the ECC decoder.

d) the mark store entry associated with the rank being decoded is not updated when the updated mark store address register value is updated, and the ECC decoder will continue to use the existing mark data associated with the rank for data correction for future read ops to the rank.

e) after the firmware (FW) has been notified that mark store address register entry has been updated, it can read out the updated mark value and apply it to the rank in which the error occurred (which is known from the error address that is trapped), or can generate its own mark update.

This allows the firmware to apply the mark update, and also to see the mark value computed by the hardware.

Thus, the marking store which is written by a slow decoder, and read by the fast decoder (for every read op) is protected with a locking mechanism or method allows the hardware continuous access to the marking store and allows for the controller firmware to be notified if the marking store has been updated and guarantees that firmware cannot write to the marking store until the firmware has seen any updates.

As the slow decoder can generally find its mark again when it assumes there is no mark placed, we set the value read from a mark store (as to a 0) when there is a parity error detected. If the slow decoder is able to recalculate the mark it can be placed back in the mark store with good parity.

In FIG. 6 the described overall computer system including an SMP CEC 104 and service processor 102 is described. The Service Processor, as mentioned, is not materially different from the POWER®6 Service processor, but the SMP CEC 104 is now a computing system which loads the marking store firmware (FW) as part of the boot, and processes the notification for the marking store as described above.

FIG. 6 shows a digital computer system 100 comprising a Service Processor (SP) 102 and a POWER®7 SMP computing system Central Electronics Complex (CEC) 101. SP 102 comprising Scan Error Recovery Firmware 106, Host Firmware 108 and Boot Firmware 110. Recovery Firmware 106 comprises computer code to implement a recovery process for recovering from a data scan error. Boot firmware 110 runs off the Central Processing Unit (CPU) 112 of SP 102. It boots the Service Processor 102 during Initial Program Load (IPL); causes the host firmware to load in the POWER®7 CEC cores of CEC 101; and then continues to run to monitor the hardware and to correct errors if errors occur. Host firmware 108 runs on processors 122 in POWER®7 CEC 102 and serves customer software applications. The host firmware is downloaded into memory for the P7-1 to P7-8 core processors in the CEC 101 and starts to run once the boot firmware completes the boot process. SP 102 also comprises memory 113, an Input/Output (IO) control mechanism 116, and a JTAG scan engine 118. The JTAG engine communicates with the Service Processor's CPU 112 to effectuate the transfer of data and signals from the SP 102 to the POWER®7 CEC cores of the CEC 101 over the CEC bus 134 coupled to the L3 cache and chip interconnect bus 180 of CEC 101 via a local SMP link 186.

In the POWER®7 CEC each of the eight chip core CPUs 122 of the CEC 101 comprise an L2 cache and a fast local L3 cache memory 183 (numbered for P7-2 and also for other cores) and CPUs P7-1 to P7-8 cores for each core of the CEC 101, with each of the cores being served by one of the CEC's memory controllers and mark store registers 181, 182, and also by an IO coupled to a remote SMP IO link 187. In addition to the local SMP link 186 for the cores on the CEC 101 the SMP IO link provides a remote SMP link. The CEC has an internal equivalent of a Peripheral Component Interconnect Host Bridge (PHB) provided by an L3 and core interconnect 180 and is connected to DDR3 memory via the two memory controllers with their mark store registers 181, 182 illustrated in FIG. 6. The cores have internal registers that are on a scan chain. This allows all combinatorial logic to be tested completely. When combined with Built-in-Self-Tests (BIST), the JTAG scan chain enables a low over-head completely embedded solution of the Service Processor to test an IC for certain static faults (shorts, opens, and logic errors). The scan chain mechanism does not generally help diagnose or test for timing, temperature or other dynamic operations errors that may occur. Thus, the cores of CEC 101 are connected in a chain by a JTAG service bus of the Service Processor 102 to the JTAG scan engine 118, which carries signals and data back to the Service Processor's 102 CPU 112. The check of the CEC 101 are also connected by SCOM (Signal Communication) bus to the CPU 112 of the Service Processor 102.

While the preferred embodiment to the invention has been described, it will be understood that those skilled in the art, both now and in the future, may make various improvements and enhancements which fall within the scope of the claims. These claims should be construed to maintain the proper protection for the invention first described.

What is claimed is:

1. A method for protection of a computer system's marking store, comprising the steps of executing a plurality of reading and writing processor operations for data processing by a computer system having a plurality of core processors and a marking store for a memory controller with hardware and firmware control, including writing in a processor operation of a processor of computer system to said computer system's marking store with a slow Error Correcting Code (ECC) decoder, and continuing during said processor operations said data processing, and reading from marking store data with a read operation said computer system's marking store with a fast ECC decoder during said data processing by said processor operations, and notifying said memory controller firmware control when the computer system's marking store has been updated to lock writing to the computer system's marking store until controller firmware has read any updates of the computer system's marking store during said data processing of said processor operations;

wherein said computer system's marking store which is written by said slow ECC decoder, and read by said fast ECC decoder for every read operation is protected with a locking mechanism allowing said hardware control continuous access to the marking store and allows for said memory controller firmware control to be notified if the marking store has been updated and which locking mechanism guarantees that controller firmware cannot write to the marking store until the controller firmware has read any updates.

2. The method for protection of a computer system's marking store according to claim 1 wherein said computer system's marking store which is written by said slow ECC decoder, and read by said fast ECC decoder for every read operation is protected with a locking mechanism allowing said hardware control continuous access to the marking store and allows for said memory controller firmware control to be notified if the marking store has been updated and which locking mechanism guarantees that controller firmware cannot write to the marking store until the controller firmware has read any updates.

3. The method for protection of a computer system's marking store according to claim 2 wherein the hardware control includes hardware marking for said memory controller and a value read from said marking store is set to a defined value when there is a parity error detected by said slow ECC decoder.

4. The method for protection of a computer system's marking store according to claim 3, such that said slow ECC decoder for said computer system's marking store which assumes there is not a mark placed is able to recalculate a mark value which is written and said mark value can be placed back in the mark store with good parity.

5. The method for protection of a computer system's marking store according to claim 4, wherein said hardware marking applies chip marks, and a work around is implemented for hardware bugs which interact with the marking process allowing computer system firmware (FW) to alter or block marks before the hardware (HW) marking is applied.

6. The method for protection of a computer system's marking store according to claim 5, automatic mark store updates are disabled by updating an unused mark store address register entry in said marking store with an updated mark data value generated by said slow ECC decoder when the slow ECC decoder has found a valid mark, and the firmware (FW) is notified that the mark store has been updated with the updated mark value.

7. The method for protection of a computer system's marking store according to claim 6, wherein, thereafter, said updated mark value is used to correct data currently being processed by said slow ECC decoder.

8. The method for protection of a computer system's marking store according to claim 7, wherein a mark store entry associated with a rank being decoded is not updated when the updated mark store address register value is updated, and said slow ECC decoder continues to use the not updated mark data associated with the rank for data correction for future read ops to the rank.

9. The method for protection of a computer system's marking store according to claim 8, wherein after the firmware (FW) has been notified that mark store address register entry has been updated, the firmware can read out the updated mark value and apply it to a memory rank in which an error occurred which is known from an address of the mark store entry associated with a rank being decoded is not updated, or generates the firmware's own mark update.

10. The method for protection of a computer system's marking store according to claim 9, wherein after there has been a firmware mark update, the firmware can also see a mark value computed by the hardware.

11. A computer system, comprising:

a Central Electronic Complex (CEC) having a plurality of core processors for said computer system which are coupled by an L3 eDRAM cache and interconnect bus of said CEC to a service processor for loading memory controller firmware to dual-channel DDR3 memory controllers with an internal marking store, said CEC having SMP Links and Remote SMP Links for connection of the core processors to other system elements, each of said dual-channel DDR3 memory controllers with loaded firmware having a 4-byte/rank mark store protected by one sense parity bit for marking data associated with each memory rank which is read and written by firmware through scan communication, said loaded firmware of said memory controllers being responsible for tracking of ECC errors using a ECC decoder control whereby said marking store is written by a slow ECC decoder, and read by a fast ECC decoder for every read operation of said memory controllers to provide a blocking mechanism for notifying marking store firmware when the marking store has been updated and which guarantees that marking store firmware cannot write to the marking store until the marking store firmware has seen updates without causing a marking store hardware to time out.

12. The computer system of claim 11, wherein said marking store has a mark store address register storing values therein to indicate when a hardware update to the marking store has occurred before the marking store firmware has read all of said marking store.

13. The computer system of claim 12, wherein said marking store has status hardware bits indicating when there is a read in progress, when read by scan communication, when set/reset by scan communication and when reset by hardware.

14. The computer system of claim 13, wherein said marking store address register is set by marking store hardware when updated by an ECC decoder of said ECC decoder control and prevents firmware mark updates from overwriting a hardware mark update.

15. The computer system according to claim 14, wherein said mark attention register's setting is used when a hardware mark has occurred.

16. The computer system according to claim 15, wherein when said mark attention register's setting is set a scan communication writes to said marking store's mark store address register and a store is inhibited.

17. A method of controlling marking store updates in a central electronic complex, comprising the steps of updating a marking store making an entry as an unused mark store address entry with an updated mark data value generated by an Error Correcting Code (ECC) slow decoder when said ECC slow decoder has found a valid mark and notifying marking store firmware that said marking store has been updated, using said updated mark data value to correct data currently being processed by said ECC slow decoder but not marking a mark store entry associated with a memory rank being decoded that has not been updated, after said marking store firmware has been notified that marking store has been updated, either reading out the updated mark data value and applying said updated mark value to the rank in which an error occurred, when known from an error address associated with the memory rank, or generating a mark update for said marking store; and continuing to use the mark data associated with said memory rank for data correction for future read operations to said memory rank.

18. The method of controlling marking store updates in a central electronic complex according to claim 17, further comprising the steps of protecting a content of marking store register files by a single parity bit covering a 4-bytes of marking information per memory rank entry, said parity being generated when data is written to said marking store by firmware or by said ECC slow decoder) and checking said parity by a fast ECC fast decoder.

19. The method of controlling marking store updates in a central electronic complex according to claim 17, further comprising the steps of, if a mark store parity error is detected by the fast ECC decoder, setting a Finite Impulse Response (FIR) bit and forcing mark data read from the marking store to zero, for a current read operation only, by a fast ECC decoder to provide for recovery of a mark store parity error through a re-write of mark data by firmware or hardware.

* * * * *